(12) United States Patent
Gong et al.

(10) Patent No.: US 12,639,337 B2
(45) Date of Patent: May 26, 2026

(54) METHOD FOR AUTOMATICALLY LABELING DATA ITEMS

(71) Applicant: Dell Products L.P., Round Rock, TX (US)

(72) Inventors: Ming Gong, Shanghai (CN); Qicheng Qiu, Shanghai (CN); Yumin Zhou, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/814,944

(22) Filed: Aug. 26, 2024

(65) Prior Publication Data

US 2026/0023758 A1      Jan. 22, 2026

(30) Foreign Application Priority Data

Jul. 22, 2024     (CN) .......................... 202410982575.1

(51) Int. Cl.
*G06F 16/28* (2019.01)

(52) U.S. Cl.
CPC ................................. *G06F 16/285* (2019.01)

(58) Field of Classification Search
CPC ...... G06F 16/00; G06F 16/144; G06F 16/245; G06F 16/2455; G06F 16/24578; G06F 16/248; G06F 16/285; G06F 16/3344; G06F 16/3347; G06F 16/35; G06F 16/355; G06F 16/9032; G06F 16/90324; G06F 16/93; G06F 16/9535; G06F 40/242; G06F 40/30; G06F 18/2155;

G06F 18/2413; G06F 18/24147; G06N 20/00; G06N 20/10; G06N 20/20; G06N 3/08; G06N 3/088; G06N 3/0895; G06N 3/09

See application file for complete search history.

(56) References Cited

U.S. PATENT DOCUMENTS

| | | | | |
|---|---|---|---|---|
| 11,520,762 | B2 * | 12/2022 | Dash ....................... | G06F 18/24 |
| 2017/0109355 | A1 * | 4/2017 | Li ...................... | G06F 16/24578 |
| 2019/0251184 | A1 * | 8/2019 | Shan ................ | G06F 16/24578 |
| 2022/0147879 | A1 * | 5/2022 | Rowan ................... | G06N 20/00 |
| 2024/0330193 | A1 * | 10/2024 | Shrestha ............ | G06F 12/0868 |
| 2025/0209309 | A1 * | 6/2025 | Matamoros ............ | G06N 20/00 |
| 2025/0298798 | A1 * | 9/2025 | Kane ..................... | G06N 20/00 |

* cited by examiner

*Primary Examiner* — Amy Ng
*Assistant Examiner* — Cheryl M Shechtman
(74) *Attorney, Agent, or Firm* — Chamberlain, Hrdlicka, White, Williams & Aughtry; Aly Z. Dossa

(57) ABSTRACT

A method for labeling data items includes receiving, from a client, user input generated by a user of the client. The method also includes generating query conditions based on the user input. Further, the method includes retrieving, from a custom knowledge system integration module and using the query conditions, a list of label candidates. In addition, the method includes determining, via the client, that the user approves the list of label candidates. Moreover, the method includes generating, based on the determination, a label candidate query using at least the list of label candidates. Further, the method includes submitting the label candidate query to a large language model (LLM) engine. Moreover, the method includes obtaining, in response to the label candidate query, a list of target labels from the LLM engine. Also, the method includes labeling a plurality of unlabeled data items using the list of target labels.

18 Claims, 7 Drawing Sheets

Step 500 — Generate, by the data labeling module, label sentences for each label in the list of target labels Step 502 — Generate, by the multimodal embedding generator, textual embeddings for each label sentence and store in the storage

METHOD FOR AUTOMATICALLY LABELING DATA ITEMS

CROSS-REFERENCE TO RELATED APPLICATIONS

This application claims priority under 35 USC 119(b) to Chinese Patent Application 202410982575.1 filed on Jul. 22, 2024. Chinese Patent Application 202410982575.1 is hereby incorporated by reference in its entirety.

BACKGROUND

Models (e.g., artificial intelligence (AI) models, machine learning models, etc.) are able to emulate logical decision-making based on available data. However, prior to being able to use such models, the models need to be trained. The training of these models is often a time consuming and complex process.

SUMMARY

In general, embodiments described herein relate to a method for labeling data items. The method includes receiving, from a client, user input generated by a user of the client. The method also includes generating query conditions based on the user input. Further, the method includes retrieving, from a custom knowledge system integration module and using the query conditions, a list of label candidates. In addition, the method includes determining, via the client, that the user approves the list of label candidates. Moreover, the method includes generating, based on the determination, a label candidate query using at least the list of label candidates. Also, the method includes submitting the label candidate query to a large language model (LLM) engine. Further, the method includes obtaining, in response to the label candidate query, a list of target labels from the LLM engine. The method also includes labeling a plurality of unlabeled data items using the list of target labels.

In general, embodiments described herein relate to a non-transitory computer readable medium including computer readable program code, which when executed by a computer processor enables the computer processor to perform a method for labeling data items, the method including receiving, from a client, user input generated by a user of the client. The method also includes generating query conditions based on the user input. Further, the method includes retrieving, from a custom knowledge system integration module and using the query conditions, a list of label candidates. In addition, the method includes determining, via the client, that the user approves the list of label candidates. Moreover, the method includes generating, based on the determination, a label candidate query using at least the list of label candidates. Further, the method includes submitting the label candidate query to a large language model (LLM) engine. In addition, the method includes obtaining, in response to the label candidate query, a list of target labels from the LLM engine. Also, the method includes labeling a plurality of unlabeled data items using the list of target labels.

In general, embodiments described herein relate to a method for labeling data items. The method includes receiving, from a client, user input generated by a user of the client. The method also includes generating query conditions based on the user input. Further, the method includes retrieving, from a custom knowledge system integration module and using the query conditions, a list of label candidates. In addition, the method includes determining, via the client, that the user approves the list of label candidates. Moreover, the method includes generating, based on the determination, a label candidate query using at least the list of label candidates. Also, the method includes submitting the label candidate query to a large language model (LLM) engine. Further, the method includes obtaining, in response to the label candidate query, a list of target labels from the LLM engine. The method also includes labeling a plurality of unlabeled data items using the list of target labels, wherein the labeling comprises: selecting an unlabeled data item from the plurality of unlabeled data items; obtaining a data item embedding for the selected unlabeled data item; performing matrix multiplication between the data item embedding with each textual embedding from a plurality of textual embeddings to obtain a set of similarity scores for the selected unlabeled data item; selecting a target label from the list of target labels with a highest similarity score in the set of similarity scores; and associating the target label with the unlabeled data item to obtain a labeled data item.

Other aspects of the embodiments disclosed herein will be apparent from the following description and the appended claims.

BRIEF DESCRIPTION OF DRAWINGS

Certain embodiments of the disclosure will be described with reference to the accompanying drawings. However, the accompanying drawings illustrate only certain aspects or implementations of the disclosure by way of example and are not meant to limit the scope of the claims.

FIG. 2.2 shows a diagram of storage in accordance with one or more embodiments of the invention.

DETAILED DESCRIPTION

Figure 1:
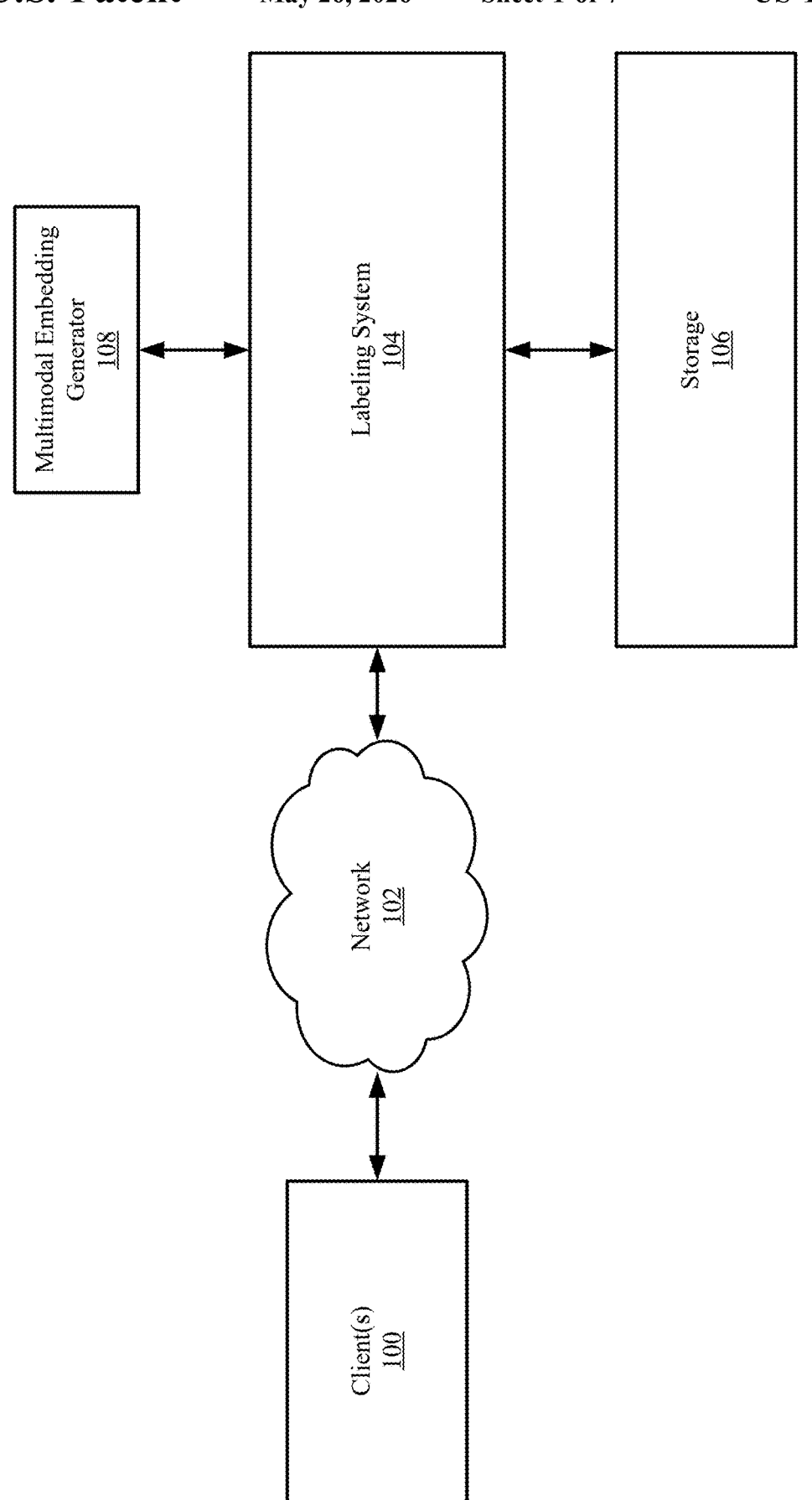
FIG. 1 shows a diagram of a system in accordance with one or more embodiments.

The labeling of data is particularly crucial in data workflows, especially those related to artificial intelligence (AI). Because data labeling is expensive, time consuming and requires manual effort, tools have been created and utilized to assist manual labeling. However, these tools are typically limited to specific verticals or tasks, such as labeling people, cars, or buildings in the autonomous driving industry.

A labeling domain may be utilized to assist the data labeling process. A labeling domain refers to an abstract grouping concept used to categorize or describe data. As a non-limiting example, when categorizing by color, "color"

will represent the labeling domain, while specific colors like red, yellow or blue will become the labels. Similarly, categorizing data by shape makes "shape" the labeling domain, while specific shapes such as a square, circle or triangle represents the labels.

In certain scenarios a user may want to modify the labeling domain, which triggers re-labeling. As a non-limiting example, consider a scenario in which a user already has "color" labels on each data item, but now wants to add a new labeling domain for "shape". In such cases, data labeling tasks often become challenging and complex. Existing approaches to assist users with labeling (and/or relabeling) include large multimodal models (LLMs), such as the Contrastive Language Image Pre-training (CLIP) model, that possess the ability to create a high-dimensional representation of various modalities of data and semantic connections in latent space. These LLMs are trained on extensive image-text paired data and utilize contrastive learning architectures, can compare the semantic similarity between given images and text descriptions.

However, these LLMs typically require a pre-defined list of labels as candidate options in order to assist with the labeling. As a result, user design becomes increasingly complex as users often struggle to provide a complete list of label candidates for the LLMs to use. Usually, they are only able to provide a label domain and a few labels as examples. As a non-limiting example, a user may want to classify images based on "color" (i.e., the label domain in this example) and consider red, yellow, and blue as typical color labels. Users may find it challenging to provide a complete set of labels within the label domain. This is especially that case when the user is attempting to label large data sets. Traditionally, the users attempt to solve this problem by "guessing" the complete set of labels or manually inspecting large portions of the data set to derive the set of labels. The former approach may lead to a poorly labeled data set while the later approach is usually impractical from a time and resource perspective.

The limitations of the traditional approaches to generating a complete label set restrict the flexibility and usability of current large multimodal models in real-world data labeling applications. For at least the reasons discussed above, a fundamentally different approach is needed to address these challenges and improve the efficiency and accuracy of data labeling. Embodiments of the invention relate to a method for labeling data items. As a result of the processes discussed below, one or more embodiments disclosed herein advantageously ensure that a pre-defined list of labels is not required from a user in order to efficiently label large datasets.

The following describes one or more embodiments.

FIG. 1 shows a system in accordance with one or more embodiments. The system may include any number of clients (100), a network (102), a labeling system (104), storage (106) and a multimodal embedding generator (108). The system may include additional, fewer, and/or different components without departing from the scope of the invention. Each component may be operably/operatively connected to any of the other components via any combination of wired and/or wireless connections. Each of these system components is described below.

In one or more embodiments, the client(s) (100) and the labeling system (104) may be operatively connected to one another through a network (102) (e.g., a local area network (LAN), a wide area network (WAN) such as the Internet, a mobile network, any other network type, or a combination thereof). The network (102) may be implemented using any combination of wired and/or wireless connections. Further, the network (102) may encompass various interconnected, network-enabled subcomponents (or systems) (e.g., switches, routers, gateways, etc.) that may facilitate communications between the client(s) (100) and the labeling system (104). Moreover, the client(s) (100) and the labeling system (104) may communicate with one another using any combination of wired and/or wireless communication protocols.

In one or more embodiments, the labeling system (104), the storage (106) and the multimodal embedding generator (108) may be operatively connected to one another. Though not shown in FIG. 1, the aforementioned components may be operatively connected through a network (102) (e.g., a local area network (LAN), a wide area network (WAN) such as the Internet, a mobile network, any other network type, or a combination thereof). In one or more embodiments, the labeling system (104), the storage (106) and the multimodal embedding generator (108) may be located on a single physical and/or logical computing system.

In one or more embodiments, the client(s) (100) includes function to permit users to interact with the labeling system. Further, the client(s) (100) includes functionality to perform at least a portion of the methods shown in FIGS. 3-6. One of ordinary skill will appreciate that the clients may perform other functionalities without departing from the scope of the invention.

In one or more embodiments disclosed herein, the client(s) (100) may be a physical device or a virtual device (i.e., a virtual machine executing on one or more physical devices) such as a personal computing system (e.g., a laptop, a cell phone, a tablet computer, a virtual machine executing on a server, etc.) of a user. For example, the client(s) (100) may be a computing system (e.g., 700, FIG. 7) as discussed below in more detail in FIG. 7.

In one or more embodiments, the labeling system (104) includes functionality to utilize the data labeling capabilities of multimodal large models and integrate user interaction by a large language model engine to determine a list of label candidates. In one or more embodiments, the labeling system (104) also integrates existing knowledge systems using retrieval augmented generation (RAG) methodology to enhance the accuracy and flexibility of labeling domains. In one or more embodiments, the labeling system (104) leverages the continuous user interaction capability of large language models to assist users in identifying the desired labeling domain. As a result, the labeling system (104) reduces user barriers and enhances system usability and user experience. Through ongoing interaction with users by utilizing the capabilities of large language models, the labeling system (104) may accurately capture user intent and provide more precise label recommendations when generating the list of label candidates. Further, the labeling system (104) includes functionality to perform at least a portion of the methods shown in FIGS. 3-6. One of ordinary skill will appreciate that the labeling system may perform other functionalities without departing from the scope of the invention.

In one or more embodiments disclosed herein, the labeling system (104) may be a physical device or a virtual device (i.e., a virtual machine executing on one or more physical devices) such as a personal computing system (e.g., a laptop, a cell phone, a tablet computer, a virtual machine executing on a server, etc.) of a user. For example, the labeling system (104) may be implemented on a computing system (e.g., 700, FIG. 7) as discussed below in more detail in FIG. 7.

Figure 2:
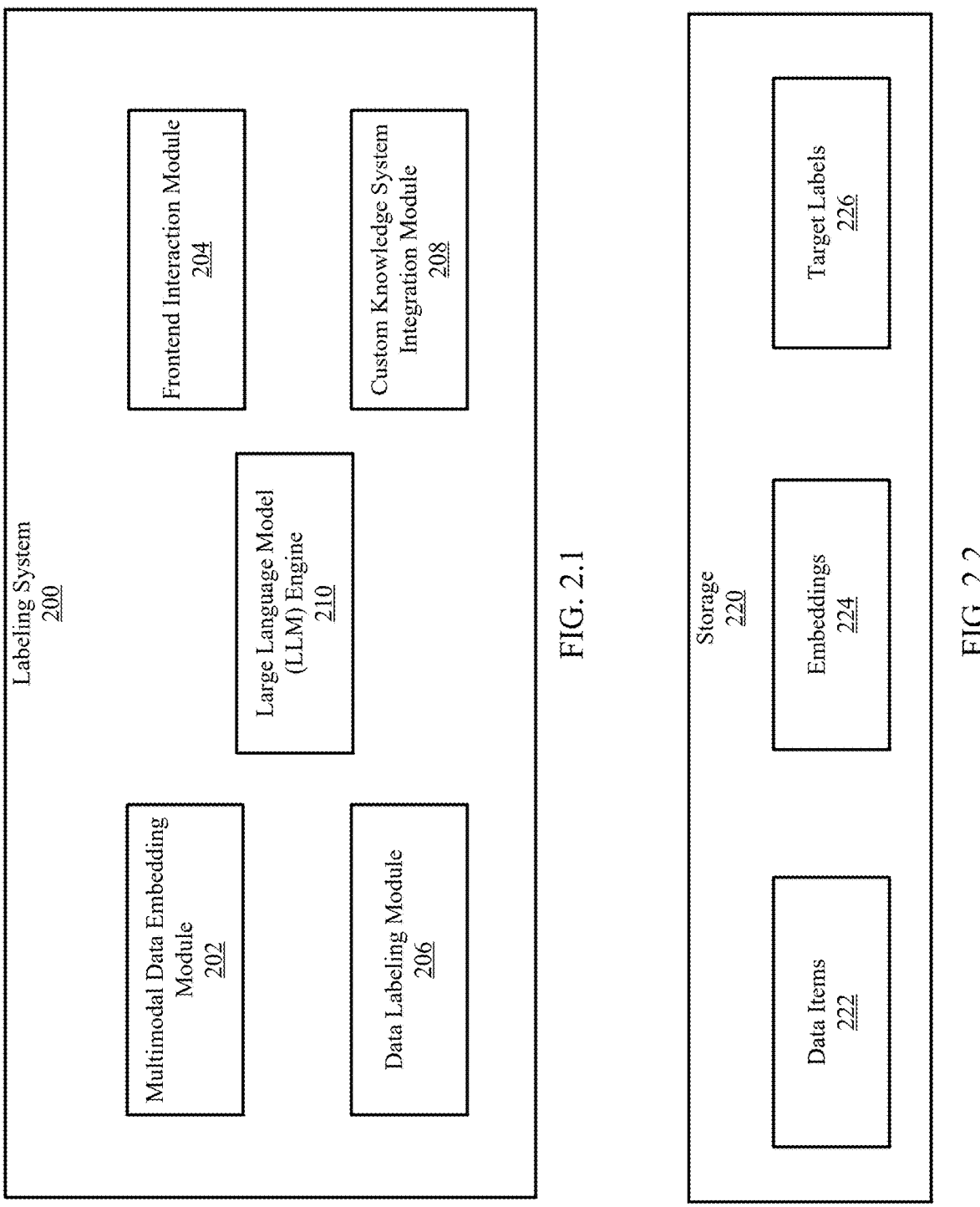
FIG. 2.1 shows a diagram of a labeling system in accordance with one or more embodiments of the invention.

Additional detail regarding one or more embodiments of the labeling system is described in FIG. 2.1.

In one or more embodiments, the storage (106) includes functionality to store data items (described below), data item embeddings (described below), textual embeddings (described below), and target labels. Each of the data items may include of multiple modalities of data without departing from the invention. The storage (106) may be volatile storage, non-volatile storage, or any combination thereof. Examples of a storage include (but are not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, and virtualized memory.

Additional detail regarding one or more embodiments of the storage is described in FIG. 2.2.

In one or more embodiments, the multimodal embedding generator (108) includes functionality to generate embeddings for multimodal data stored in storage. In one or more embodiments, the multimodal embedding generator (108) utilizes Contrastive Language-Image Pre-training (CLIP) models to map multimodal data into a shared feature space to establish semantic connections. These CLIP models are trained on extensive image-text paired data and utilize contrastive learning architectures. The models have the ability to compare the semantic similarity between given images and text descriptions, and possess strong transfer learning capabilities. Further, these models are able to perform zero-shot learning, where the model can make inferences on unseen datasets without the need for fine-tuning. As a result, the pre-trained model may be used directly. In one or more embodiments, the multimodal embedding generator (108) may be configured to provide Application Programming Interface (API) calls for data embedding and automatic labeling. In one or more embodiments, the multimodal embedding generator (108) generates embeddings of multimodal data to support the frontend interaction module (e.g. frontend interaction module (204) in FIG. 2.1) and the data labeling module (e.g., data labeling module (206) in FIG. 2.1). Further, the multimodal embedding generator (108) includes functionality to perform at least a portion of the methods shown in FIGS. 3-6. One of ordinary skill will appreciate that the multimodal embedding generator may perform other functionalities without departing from the scope of the invention.

In one or more embodiments disclosed herein, the multimodal embedding generator (108) may be a physical device or a virtual device (i.e., a virtual machine executing on one or more physical devices) such as a personal computing system (e.g., a laptop, a cell phone, a tablet computer, a virtual machine executing on a server, etc.) of a user. For example, the multimodal embedding generator (108) may be implemented on a computing system (e.g., 700, FIG. 7) as discussed below in more detail in FIG. 7.

FIG. 2.1 shows a labeling system (200) in accordance with one or more embodiments. The labeling system (200) includes a multimodal data embedding module (202), a frontend interaction module (204), a data labeling module (206), a custom knowledge system integration module (208), and a large language model (LLM) engine (210). Each of these components is described below.

In one or more embodiments, the multimodal data embedding module (202) includes functionality to scan and process the data items in storage. In one or more embodiments, the multimodal data embedding module (202) utilizes large multimodal models to extract embeddings representing multimodal data, including semantic representations of images and text. In one or more embodiments, the multimodal data embedding module (202) supports the frontend interaction module (204) and the data labeling module (206).

In one or more embodiments, the frontend interaction module (204) includes functionality to facilitate communications between the labeling system (200) and the client(s) (100) to determine suitable labeling domains through dialogue and generate corresponding lists of label candidates. To that extent, the frontend interaction module (204) may include functionality to: receive user inputs (e.g., audio or textual information) from a client(s) (100); perform preliminary processing to convert the user inputs into a machine readable format; provide the user inputs to the other components of the labeling system (200); receive responses; provide the responses to the labeling system (200); receive feedback (i.e., additional user inputs reflecting whether the responses properly addressed the user inputs); and repeat all of the above to form a conversation with a user by collaborating with the LLM engine (210). In one or more embodiments, the frontend interaction module (204) may take the form of a chatbot or similar interface. In one or more embodiments, the frontend interaction module (204) may be designed to significantly reduce user thresholds and enhance system usability. One of ordinary skill will appreciate that the frontend interaction module (204) may perform other functionalities without departing from the scope of the disclosure.

In one or more embodiments, the data labeling module (206) includes functionality to combine each label in the list of target labels with the data item to generate label sentences. For example, a label sentence may be "a picture of [label]". In one or more embodiments, the data labeling module (206) may be configured to automatically label given images based on the generated list of target labels. To provide this functionality, the data labeling module (206) may utilize parallelized matrix multiplication to compute the similarity between each data item and each label sentence to select the label with the highest similarity for each image. In one or more embodiments, the data labeling module (206) may be designed and configured to significantly improve the speed and efficiency of data labeling.

In one or more embodiments, the data labeling module (206) generates label sentences by transforming each label in the list of target labels into a sentence description. This process utilizes a prompt template containing information about the data item and the label to generate a full sentence. For example, for the label "dog", a template like "a picture of a [label]" can be used to generate a descriptive sentence. Other template examples may include: "a photo of many [label]"; "a low resolution photo of the [label]"; "a photo of a cool [label]".

In one or more embodiments, the data labeling module (206) performs parallelized matrix multiplication between the embeddings of the label sentence, and the embeddings of the data item to obtain their similarity score. Based on the similarity scores, the data labeling module (206) will select the most matching label (i.e., the label associated with the highest similarity score) for each data item and use the selected label to label the data item. One of ordinary skill will appreciate that the data labeling module (206) may perform other functionalities without departing from the scope of the disclosure.

In one or more embodiments, the custom knowledge system integration module (208) includes functionality to refine and recognize labeling domains and improve the accuracy of the list of label candidates. To provide this functionality, the custom knowledge system integration module (208) integrates existing knowledge systems, such as knowledge graphs, ontologies, or text-based knowledge base articles, utilizing retrieval-augmented generation (RAG) architecture. A RAG approach uses precise information obtained through retrieval to enhance the outcome of a generative model. In one or more embodiments, the custom knowledge system integration module (208) may be configured as a typical knowledge repository module in RAG systems that retrieves relevant information by indexing data in the existing knowledge system based on the query conditions provided. One of ordinary skill will appreciate that the custom knowledge system integration module (208) may perform other functionalities without departing from the scope of the disclosure.

In one or more embodiments, the custom knowledge system integration module (208) may utilize ontologies to obtain expressions of concepts specific to the domain and their interrelations. This aids in better understanding and delineating label domains, thereby enhancing the accuracy and reliability of the labeling system (200). In one or more embodiments, the custom knowledge system integration model (208) may also utilize knowledge graphs to access information on relevant entities and their relationships. Knowledge graphs utilize semantic searching and intelligent reasoning to capture direct or indirect hierarchical relationships between entities. As a result, knowledge graphs gain a comprehensive understanding of the structure and content of label domains. In one or more embodiments, the custom knowledge system integration module (208) may also parse through unstructured documents to extract domain-specific terminology. This enriched vocabulary enhances label candidates, improving the label system's (200) understanding and adaptability to complex domains.

In one or more embodiments, the large language model (LLM) engine (210) includes functionality to generate responses based on user input by collaborating with the frontend interaction module (204) and the custom knowledge system integration module (208). In one or more embodiments, the LLM engine (210) may utilize generative capabilities to produce a list of label candidates and a list of target labels that meet the specified requirements based on user input. In one or more embodiments, the LLM engine (210) may generate new prompts, displayed to the user via the frontend interaction module (204) to obtain additional user input. In one or more embodiments, the LLM engine (210) is RAG-based to engage in discussions with users to generate more comprehensive lists of label candidates. One of ordinary skill will appreciate that the LLM engine (210) may perform other functionalities without departing from the scope of the disclosure.

FIG. 2.2 shows a diagram of storage (220) in accordance with one or more embodiments of the invention. In one or more embodiments, users may store their raw, unprocessed multimodal data. The storage (220) may take various forms, such as a file system for unstructured data or a database for storing labeling information. The storage (220) includes data items (222), embeddings (224) and target labels (226). Each of these system components is described below.

In one or more embodiments, the storage may include data items (222) of different modalities, such as visual (images, videos), textual, and auditory (voice, sounds, music).

In one or more embodiments, embeddings (224) (e.g., data item embeddings (described below) and textual embeddings (described below)) represent data item in a numerical representation. In one or more embodiments, an "embedding" is an ordered collection of numeric values that represents an input in a particular embedding space. For example, an embedding may be a vector of floating point or other numeric values that has a fixed dimensionality.

In one or more embodiments, embeddings (224) may be saved in an embedding store (not shown) that manages the storage of embeddings for various multimodal data. This store can be vector database for moderate-scale data or some other optimized store. In one or more embodiments, the vector database has efficient similarity search capabilities, allowing for rapid retrieval of vectors most similar to a given vector. In one or more embodiments, vector storage is utilizes for extremely large-scale data scenarios. This storage system supports highly parallel vector insertion and query operations, making it suitable for processing and storing large-scale data efficiently.

In one or more embodiments, target labels (226) are the labels generated by the LLM engine (210) that meet specified requirements. These requirements may be based on user input and relevant information retrieved by the custom knowledge system integration module (208).

Figure 3:
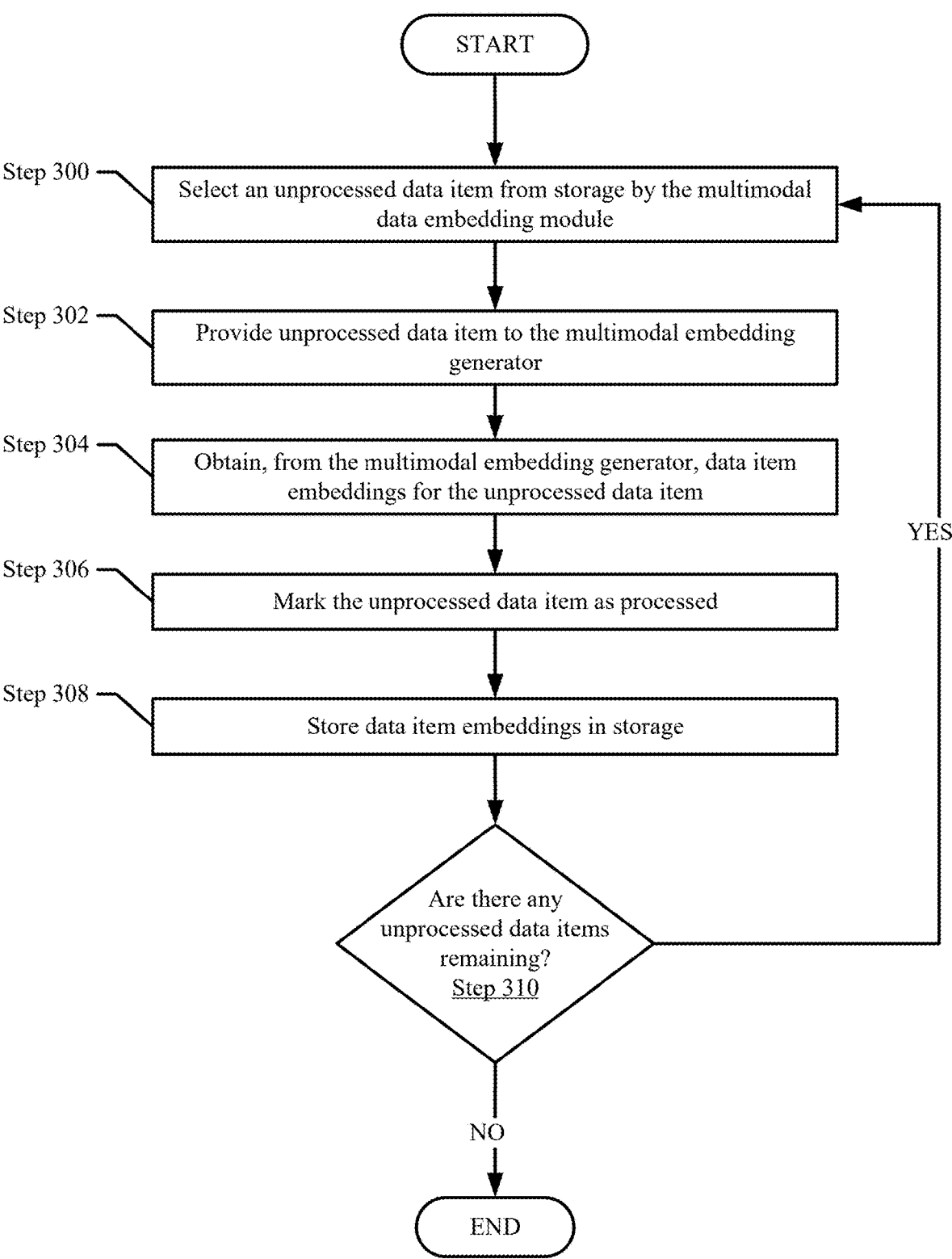
FIG. 3 shows a flowchart of a method for obtaining data item embeddings in accordance with one or more embodiments of the invention.

Turning to FIG. 3, FIG. 3 shows a flowchart describing a method for obtaining data item embeddings in accordance with one or more embodiments disclosed herein. The method may be performed by, for example, the labeling system (200, FIG. 2). Other components in the system may perform this method without departing from the invention.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 3 may be performed concurrently with one or more steps in FIGS. 4-6.

In step 300, an unprocessed data item is selected from storage (e.g., the storage (220) in FIG. 2.2) by the multimodal data embedding module (e.g. the multimodal data embedding module (202) in FIG. 2.1). In one or more embodiments, the multimodal data embedding module (202) scans the data items to determine which data items need to be processed.

In step 302, the unprocessed data item is provided to the multimodal embedding generator (e.g., the multimodal embedding generator (108) in FIG. 1).

In step 304, data item embeddings are obtained from the multimodal embedding generator for the unprocessed data item provided in step 302. In one or more embodiments, the multimodal embedding generator (e.g., the multimodal embedding generator (108) in FIG. 1) utilizes a large multimodal model, such as the CLIP model, to generate embeddings representing the data item.

In step 306, the unprocessed data item is marked as processed. In one or more embodiments, a processed data item may represent that embeddings of the data item have already been obtained.

In step 308, the data item embeddings are stored in storage (e.g., the storage (220) in FIG. 2.2). In one or more embodiments, the data item embeddings are stored as embeddings (e.g. embeddings (224) in FIG. 2.2) in storage.

In step 310, the labeling system (200) makes a determination as to whether there are any unprocessed data items remaining. Accordingly, in one or more embodiments, if the result of this determination is YES, the method proceeds back to step 300. If the result of the determination is NO, the method may end following step 310. In one or more embodiments, the method will continue to be performed until there are no unprocessed data items left.

Figure 4:
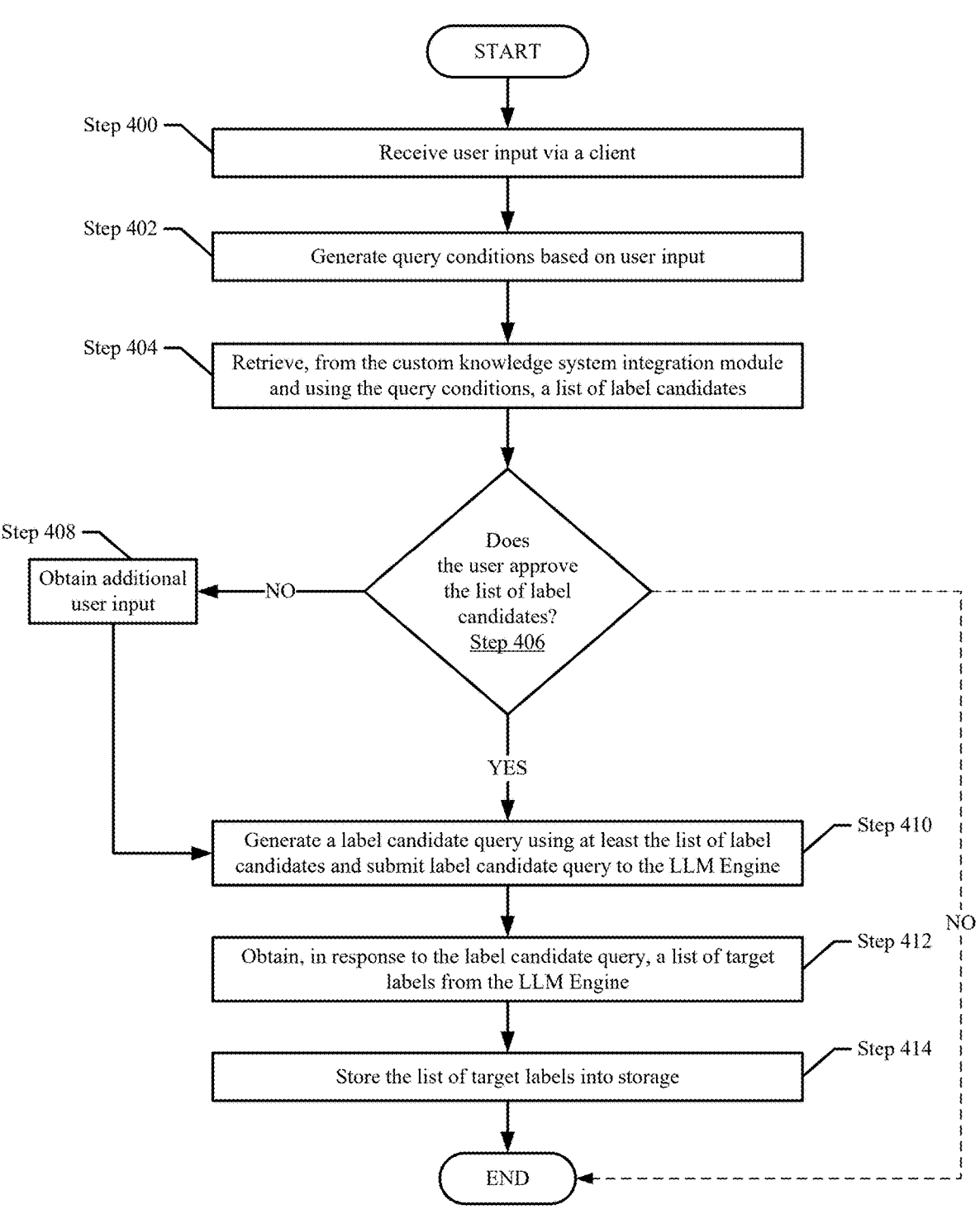
FIG. 4 shows a flowchart of a method for obtaining a list of target labels in accordance with one or more embodiments of the invention.

Turning to FIG. 4, FIG. 4 shows a flowchart of a method for obtaining a list of target labels in accordance with one or more embodiments of the invention. The method may be performed by, for example, the labeling system (200, FIG. 2).

While the various steps in the flowchart shown in FIG. 4 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 4 may be performed concurrently with one or more steps in FIGS. 3 and 5-6.

In step 400, user input is received via a client. User input may be in the form of text, audio, video, touch, motion or any combination thereof. In one or more embodiments, the user input may be received by the frontend interaction module (e.g. frontend interaction module (204) in FIG. 2.1). As a non-limiting example, a user may want to label their bird images and provide user input of this intent. In this example, the user may write a prompt via the frontend interaction module (204), such as "I want to classify the bird images into categories such as Mallard Duck and Chaffinch, and at this level of granularity".

In step 402, query conditions are generated based on user input. In one or more embodiments, the LLM engine (210) generates the query conditions. In one or more embodiments, query conditions may represent criteria, based on the user input, which are used to limit results obtained from the custom knowledge system integration module in response to a query (see e.g., step 404). A non-limiting example of query conditions is "bird categories; bird". These query conditions would limit the query results to only pertain to different classifications of bird species.

In step 404, the frontend interaction module issues a query (which includes the query conditions) to the custom knowledge system integration module. In response, the custom knowledge system integration module retrieves a list of label candidates using the query conditions. As a non-limiting example, the list of label candidates retrieved by the custom knowledge system integration module may describe the classification of bird species by taxonomy, such as Passeriformes (perching birds), Anseriformes (waterfowl), Gruiformes (cranes), Columbiformes (pigeons), and Galliformes (gamefowl). In this example, the classification of birds using their taxonomy is broader than classifying the birds by their species.

In step 406, a determination is made as to whether the user approves the list of label candidates obtain in step 404. Accordingly, in one or more embodiments, if the result of this determination is YES, the method proceeds to step 410. In one or more embodiments, if the result of the determination is NO, the method may proceed to step 408. In another embodiment, if the result of the determination is NO, the method may end following step 406.

In one or more embodiments, the user may approve the list of label candidates via the frontend interaction module (e.g. frontend interaction module (204) in FIG. 2.1). The frontend interaction module (204) may invoke the application programming interface of the LLM engine (e.g. LLM engine (210) in FIG. 2.1) to generate a new prompt to the user to ask whether the user approves the list of label candidates. As a non-limiting example, the LLM engine may construct a prompt to the user, such as "I have the following custom knowledge data describing the classification of bird species". The frontend interaction module (204) may present (via a display on the client) the prompt and the list of label candidates for the user to approve. Continuing with the example above, the user may not approve the list of bird classifications by their taxonomy because they believe that it is too broad. In such cases, the method proceeds to step 408.

In step 408, additional user input is obtained. In one more embodiments, the frontend interaction module (204) obtains the additional user input (via the client). In one or more embodiments, the additional user input is utilized to improve the list of label of candidates. In one or more embodiments, after additional user input is obtained, the custom knowledge system integration module (208) may retrieve additional relevant information to improve the list of label candidates. As a non-limiting example, the user may write a prompt, such as "I want to classify these bird species into more specific category labels such as 'MallardDuck', 'Chaffinch', etc. Please help me list possible category labels as a list."

In step 410, a label candidate query is generated using at least the list of label candidates and is submitted to the LLM engine (210). In one or more embodiments, when the step 410 is performed after step 408, the list of label candidates and additional user input may be used to generate the label candidate query. In one or more embodiments, when the step 410 is performed after step 406 (i.e., step 408 is not performed), the list of label candidates (without any additional user input) is used to generate the label candidate query. In one or more embodiments, the label candidate query is generated by the frontend interaction module (204). In one or more embodiments, the label candidate query is submitted to the LLM engine (210) by the frontend interaction module (204).

In step 412, in response to the label candidate query, a list of target labels is obtained from the LLM engine (210). In one or more embodiments, the list of target labels meets specified requirements based the user input (and, if provided, the additional user input). As a non-limiting example, the list of target label may include {"MallardDuck", "MandarinDuck", "Goose", "HouseSparrow", "Chaffinch", "Goldfinch", "CommonChiffchaff", "Willow Warbler", "Blackcap", "EuropeanRobin", "Nightingale", "Redstart", "CommonCrane", "SiberianCrane", "Pigeon", "Dove", "CrestedPigeon", "Quail", "Pheasant", "Chicken"}. In this example, the target labels represent classifications of birds at the level of granularity the user desired.

In step 414, the list of target labels are stored into storage. In one or more embodiments, the list of target labels may be stored as target labels (e.g. target labels (226) in FIG. 2.2).

In one or more embodiments, the method may end following step 414.

Figure 5:
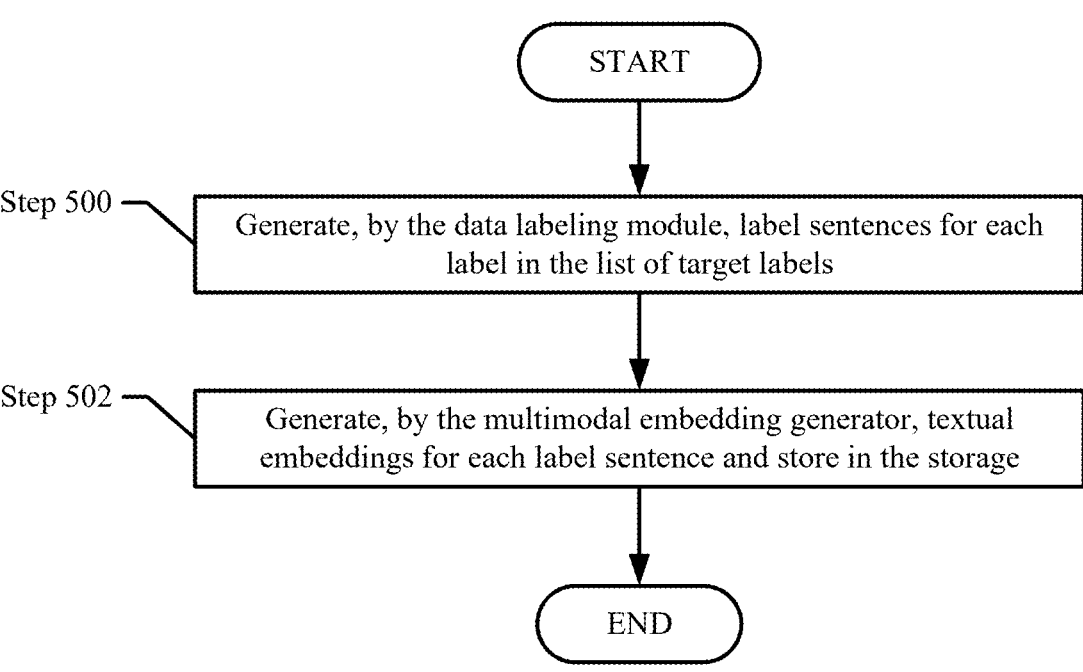
FIG. 5 shows a flowchart of a method for generating textual embeddings in accordance with one or more embodiments of the invention.

Turning to FIG. 5, FIG. 5 shows a flowchart of a method for generating textual embeddings in accordance with one or more embodiments of the invention. The method may be performed by, for example, the labeling system (200, FIG. 2). Other components in the system may perform this method without departing from the invention.

While the various steps in the flowchart shown in FIG. 5 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 5 may be performed concurrently with one or more steps in FIGS. 3-4 and 6.

In step 500, label sentences are generated by the data labeling module for each label in the list of target labels. To provide this functionality, the data labeling module (206) utilizes a prompt template containing information about data items that are to be labels and the label to generate a full sentence. As a non-limiting example, if the data item to label is an image, the prompt template of "a picture of a [label]" may be used to generate the label sentence: "a picture of a Chaffinch". The result of step 500 is a set of label sentences.

In step 502, textual embeddings are generated by the multimodal embedding generator for each label sentence (generated in step 500) and stored in the storage. In one or more embodiments, the multimodal embedding generator (e.g., the multimodal embedding generator (108) in FIG. 1) utilizes a large multimodal model, such as the CLIP model, to extract embeddings representing the label sentence. In one or more embodiments, the textual embeddings are stored as embeddings (e.g. embeddings (224) in FIG. 2.2) in storage.

In one or more embodiments, the method may end following step 502.

Figure 6:
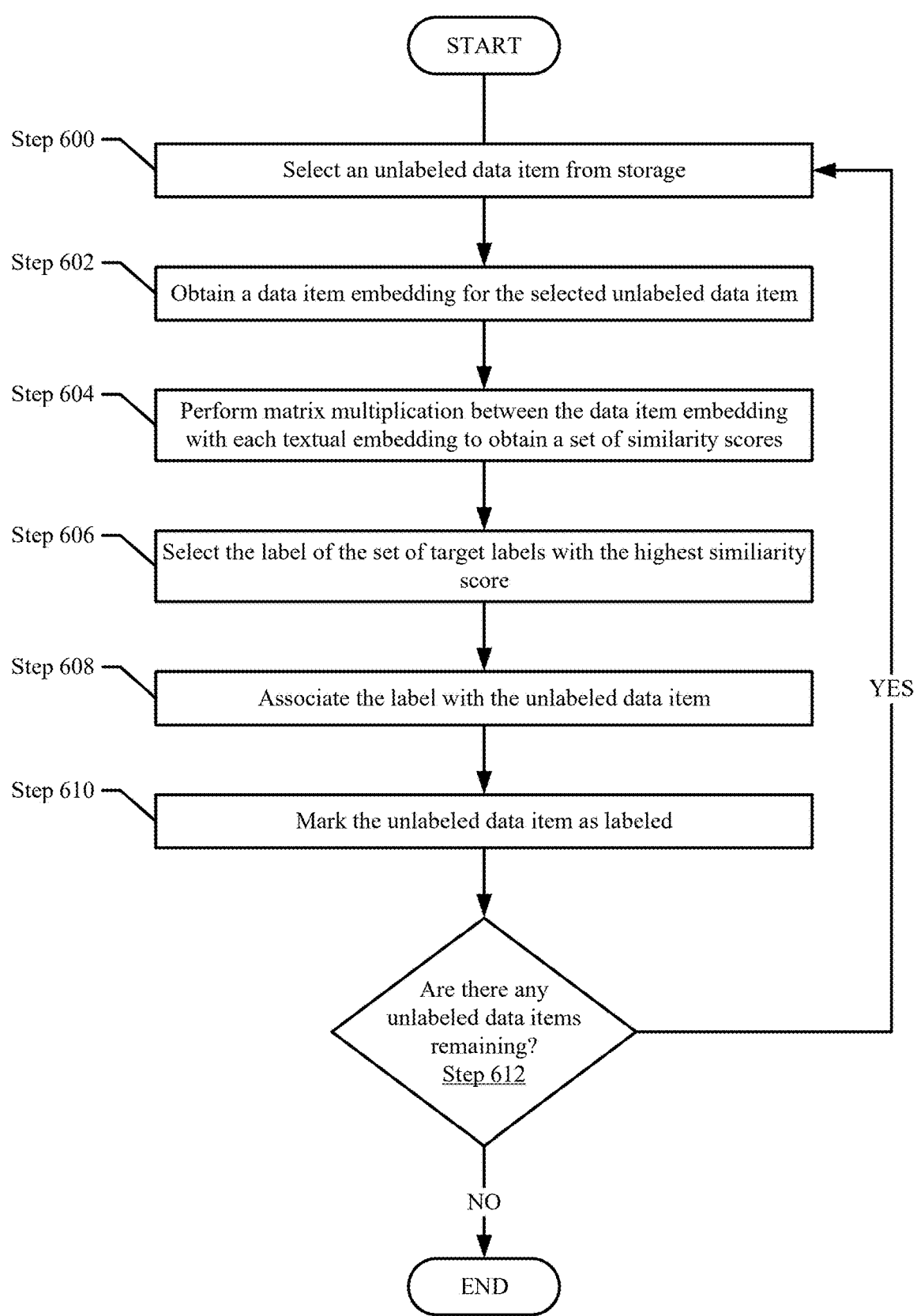
FIG. 6 shows a flowchart of a method for labeling data items in accordance with one or more embodiments of the invention.

Turning to FIG. 6, FIG. 6 shows a flowchart of a method for labeling data items in accordance with one or more embodiments of the invention. The method may be performed by, for example, the labeling system (200, FIG. 2). Other components in the system may perform this method without departing from the invention.

While the various steps in the flowchart shown in FIG. 6 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 6 may be performed concurrently with one or more steps in FIGS. 3-5.

In step 600, an unlabeled data item is selected from storage. In one or more embodiments, the data labeling module (e.g. data labeling module (206) in FIG. 2.1) selects the unlabeled data item that requires labeling. For example, the unlabeled data item is an image.

In step 602, a data item embedding is obtained for the selected unlabeled data item. In one or more embodiments, the data item embedding is obtained from embeddings (e.g. embeddings (224), in FIG. 2.2) stored in storage (e.g. storage (220) in FIG. 2.2), where the data item embedding was previously generated in FIG. 3.

In step 604, matrix multiplication is performed between the data item embedding with each textual embedding to obtain a set of similarity scores. In one or more embodiments, the matrix multiplication is performed once to obtain the set of similarity scores.

As a non-limiting example, there may be N labels and M data items. N represents the set of textual embedding for the list of target labels (see e.g., Step 414). M represents the set of data item embeddings for the set of unlabeled data items. Matrix multiplication is performed, resulting in an N×M matrix. This matrix contains the similarity scores between each label and each data item. More specifically, each textual embedding in the set of textual embeddings is multiplied by the data item embedding for the unlabeled data item. The result of the multiple operation is a set of similarity scores for the unlabeled data item. The similarity scores reflect the similar between each textual embedding and the data item embedding. The higher the similar score the greater the similarity (or overlap) between the given textual embedding and the data item embedding.

In step 606, a label of the set of target labels with the highest similarity score is selected. For example, consider a scenario in which textual embeddings for the following three target labels (Goose, Chaffinch, Nightingale) (N) are multiple with the data item embeddings for four images (Image 1, Image 2, Image 3, Image 4) (M). In the example, the resulting N×M matrix may be as follows:

|  | Image 1 | Image 2 | Image 3 | Image 4 |
|---|---|---|---|---|
| Goose | 0.80 | 0.17 | 0.02 | 0.80 |
| Chaffinch | 0.17 | 0.80 | 0.17 | 0.17 |
| Nightingale | 0.02 | 0.02 | 0.80 | 0.02 |

Based on the above matrix, Image 1 would be labeled as "Goose", Image 2 would be labeled as "Chaffinch", Image 3 would be labeled as "Nightingale", and Image 4 would be labeled as "Goose".

Continuing with the discussion of FIG. 6, in step 608, the label is associated with the unlabeled data item. In one or more embodiments, the data item is now labeled with the most precise label in a given labeling domain based on user input.

In step 610, the unlabeled data item is marked as labeled.

In step 612, the labeling system (200) makes a determination as to whether there are any unlabeled data items remaining. Accordingly, in one or more embodiments, if the result of this determination is YES, the method proceeds back to step 600. In one or more embodiments, the method will continue to be performed until there are no unlabeled data items remaining. As a result, all the data items will be labeled. In another embodiment, if the result of the determination is NO, the method may end following step 612.

Figure 7:
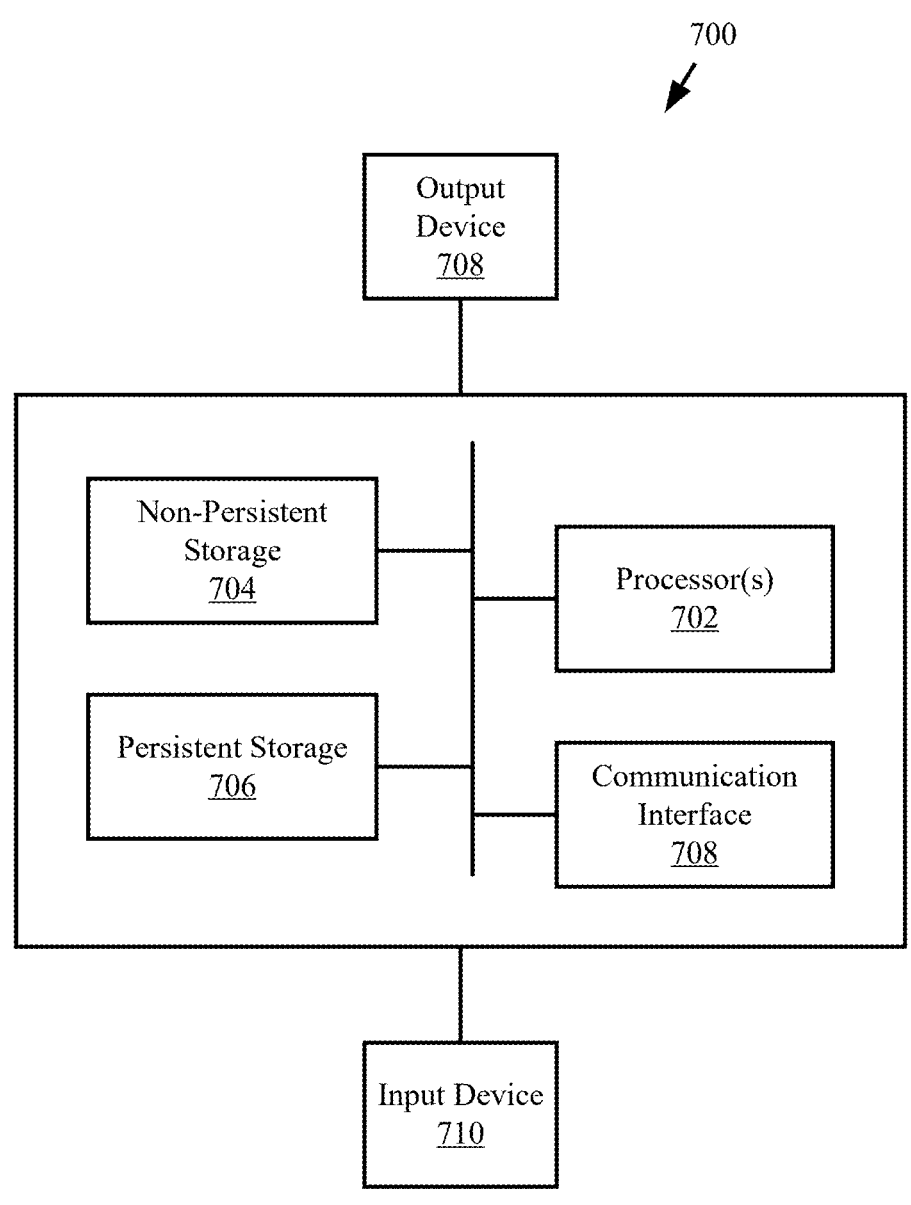
FIG. 7 shows a computing system in accordance with one or more embodiments of the invention.

Embodiments of the disclosure may be implemented using computing devices. FIG. 7 shows a diagram of a computing device (700) in accordance with one or more embodiments. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (708) (e.g., Bluetooth interface, infrared interface, network interface, optical interface, etc.), input devices (710), output devices (708), and numerous other elements (not shown) and functionalities. Each of these components is described below.

In one embodiment, the computer processor(s) (702) may be an integrated circuit for processing instructions. For example, the computer processor(s) (702) may be one or more cores or micro-cores of a processor. The computing device (700) may also include one or more input devices (710), such as a touchscreen, keyboard, mouse, microphone, touchpad, electronic pen, or any other type of input device. The communication interface (708) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) (708, 710) may be locally or remotely connected to the computer processor(s) (702), non-persistent storage (704), and persistent storage (706). Many diverse types of computing devices exist, and the aforementioned input and output device(s) (710, 708) may take other forms.

The problems discussed above should be understood as being examples of problems solved by embodiments of the disclosure and the disclosure should not be limited to solving the same/similar problems. The disclosed disclosure is broadly applicable to address a range of problems beyond those discussed herein.

Specific embodiments will now be described with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the prior description of the figures, any component described with regard to a figure, in various embodiments of the invention, may be equivalent to one or more like-named components described with regard to any other figure. For brevity, descriptions of these components are not repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for labeling data items, the method comprising:

receiving, from a client, user input generated by a user of the client;

generating query conditions based on the user input;

retrieving, from a custom knowledge system integration module and using the query conditions, a list of label candidates, wherein the list of label candidates is associated with a labeling domain;

determining, via the client, that the user approves the list of label candidates;

generating, based on the determination, a label candidate query using at least the list of label candidates;

submitting the label candidate query to a large language model (LLM) engine;

obtaining, in response to the label candidate query, a list of target labels from the LLM engine; and labeling a plurality of unlabeled data items using the list of target labels, wherein the labeling comprises:

selecting an unlabeled data item from the plurality of unlabeled data items;

obtaining a data item embedding for the selected unlabeled data item;

performing matrix multiplication between the data item embedding with each textual embedding from a plurality of textual embeddings to obtain a set of similarity scores for the selected unlabeled data item, wherein each of the plurality of textual embeddings is associated with a target label from the list of target labels, and wherein each of the similarity scores in the set of similarity scores is associated with a target label from the list of target labels;

selecting a target label from the list of target labels with a highest similarity score in the set of similarity scores, wherein the target label reflects a most accurate label of the labeling domain for the unlabeled data item; and associating the target label with the unlabeled data item to obtain a labeled data item.

2. The method of claim 1, the method further comprising:

prior to the labeling of the plurality of unlabeled data items:

obtaining, from a multimodal embedding generator, a plurality of data item embeddings for each of the plurality of unlabeled data items, wherein the plurality of data item embeddings are used in the labeling.

3. The method of claim 2, wherein a multimodal embedding generator utilizes contrastive language-image pre-training (CLIP) models to generate the plurality of data item embeddings.

4. The method of claim 1, the method further comprising:

generating, by a data labeling module, label sentences for each label in the list of target labels; and generating, by the multimodal embedding generator, textual embeddings for each label sentence to obtain a plurality of textual embeddings, wherein the plurality of textual embeddings are used in the labeling.

5. The method of claim 4, wherein the multimodal embedding generator utilizes contrastive language-image pre-training (CLIP) models to generate the plurality of textual embeddings.

6. The method of claim 1, wherein the custom knowledge system integration module utilizes retrieval augmented generation (RAG) methodology to retrieve a list of label candidates.

7. The method of claim 6, wherein the custom knowledge system integration module comprises at least knowledge graphs, ontologies, and text based knowledge base articles.

8. The method of claim 1, wherein determining, via the client, that the user approves the list of label candidates comprises:

receiving additional user input from the user; and wherein the label candidate query is generated, at least in part, using the additional user input.

9. A non-transitory computer readable medium (CRM) comprising computer readable program code, which when executed by a computer processor, enables the computer to perform a method for labeling data items, the method comprising:

receiving, from a client, user input generated by a user of the client;

generating query conditions based on the user input;

retrieving, from a custom knowledge system integration module and using the query conditions, a list of label candidates, wherein the list of label candidates is associated with a labeling domain;

determining, via the client, that the user approves the list of label candidates;

generating, based on the determination, a label candidate query using at least the list of label candidates;

submitting the label candidate query to a large language model (LLM) engine;

obtaining, in response to the label candidate query, a list of target labels from the LLM engine; and labeling a plurality of unlabeled data items using the list of target labels, wherein the labeling comprises:

selecting an unlabeled data item from the plurality of unlabeled data items;

obtaining a data item embedding for the selected unlabeled data item;

performing matrix multiplication between the data item embedding with each textual embedding from a plurality of textual embeddings to obtain a set of similarity scores for the selected unlabeled data item, wherein each of the plurality of textual embeddings is associated with a target label from the list of target labels, and wherein each of the similarity scores in the set of similarity scores is associated with a target label from the list of target labels;

selecting a target label from the list of target labels with a highest similarity score in the set of similarity scores, wherein the target label reflects a most accurate label of the labeling domain for the unlabeled data item; and associating the target label with the unlabeled data item to obtain a labeled data item.

10. The non-transitory CRM of claim 9, the method further comprising:

prior to the labeling of the plurality of unlabeled data items:

obtaining, from a multimodal embedding generator, a plurality of data item embeddings for each of the plurality of unlabeled data items, wherein the plurality of data item embeddings are used in the labeling.

11. The non-transitory CRM of claim 10, wherein the multimodal embedding generator utilizes contrastive language-image pre-training (CLIP) models to generate the plurality of data item embeddings.

12. The non-transitory CRM of claim 9, the method further comprising:

generating, by a data labeling module, label sentences for each label in the list of target labels; and generating, by a multimodal embedding generator, textual embeddings for each label sentence to obtain a plurality of textual embeddings, wherein the plurality of textual embeddings are used in the labeling.

13. The non-transitory CRM of claim 12, wherein the multimodal embedding generator utilizes contrastive language-image pre-training (CLIP) models to generate the plurality of textual embeddings.

14. The non-transitory CRM of claim 9, wherein the custom knowledge system integration module utilizes retrieval augmented generation (RAG) methodology to retrieve a list of label candidates.

15. The non-transitory CRM of claim 14, wherein the custom knowledge system integration module comprises at least knowledge graphs, ontologies, and text based knowledge base articles.

16. The non-transitory CRM of claim 9, wherein determining, via the client, that the user approves the list of label candidates comprises:

receiving additional user input from the user; and wherein the label candidate query is generated, at least in part, using the additional user input.

17. A method for labeling data items, the method comprising:

receiving, from a client, user input generated by a user of the client;

generating query conditions based on the user input;

retrieving, from a custom knowledge system integration module and using the query conditions, a list of label candidates, wherein the list of label candidates is associated with a labeling domain;

determining, via the client, that the user approves the list of label candidates;

generating, based on the determination, a label candidate query using at least the list of label candidates;

submitting the label candidate query to a large language model (LLM) engine;

obtaining, in response to the label candidate query, a list of target labels from the LLM engine;

labeling a plurality of unlabeled data items using the list of target labels, wherein the labeling comprises:

selecting an unlabeled data item from the plurality of unlabeled data items, obtaining a data item embedding for the selected unlabeled data item;

performing matrix multiplication between the data item embedding with each textual embedding from a plurality of textual embeddings to obtain a set of similarity scores for the selected unlabeled data item, selecting a target label from the list of target labels with a highest similarity score in the set of similarity scores, wherein the target label reflects a most accurate label of the labeling domain for the unlabeled data item; and associating the target label with the unlabeled data item to obtain a labeled data item.

18. The method of claim 17, wherein determining, via the client, that the user approves the list of label candidates comprises:

receiving additional user input from the user; and wherein the label candidate query is generated, at least in part, using the additional user input.

* * * * *